Sept. 15, 1964 D. G. HOLINBECK 3,148,619
HIGH FREQUENCY IMMUNE SQUIB
Filed June 16, 1961 9 Sheets-Sheet 1

*INVENTOR.*
DALE G. HOLINBECK
BY
ATTORNEY

Sept. 15, 1964 D. G. HOLINBECK 3,148,619
HIGH FREQUENCY IMMUNE SQUIB
Filed June 16, 1961 9 Sheets-Sheet 3

INVENTOR.
DALE G. HOLINBECK
BY
ATTORNEY

Sept. 15, 1964 D. G. HOLINBECK 3,148,619
HIGH FREQUENCY IMMUNE SQUIB
Filed June 16, 1961 9 Sheets-Sheet 4

INVENTOR.
DALE G. HOLINBECK
BY
ATTORNEY

Sept. 15, 1964    D. G. HOLINBECK    3,148,619
HIGH FREQUENCY IMMUNE SQUIB
Filed June 16, 1961    9 Sheets-Sheet 5

INVENTOR.
DALE G. HOLINBECK
BY
ATTORNEY

Sept. 15, 1964　　　D. G. HOLINBECK　　　3,148,619
HIGH FREQUENCY IMMUNE SQUIB
Filed June 16, 1961　　　　　　　　　　　　　　　9 Sheets-Sheet 8

INVENTOR.
DALE G. HOLINBECK
BY
ATTORNEY

United States Patent Office 3,148,619
Patented Sept. 15, 1964

3,148,619
HIGH FREQUENCY IMMUNE SQUIB
Dale G. Holinbeck, Madison, Wis., assignor to Bjorksten Research Laboratories for Industry, Inc., Fitchburg, Wis., a corporation of Wisconsin
Filed June 16, 1961, Ser. No. 117,531
18 Claims. (Cl. 102—28)

This invention relates to an electrically actuated detonator for an explosive charge, hereafter called a squib, and more particularly relates to a squib in combination with circuitry which prevents the squib from being accidentally detonated by high frequency current in the firing circuit.

Electrically detonated armaments such as rockets, missiles, and recoilless rifles, and demolition charges such as dynamite are vulnerable to accidental detonation by high-intensity environmental electromagnetic radiation such as by radio and radar beams which induce electric currents in the firing circuit of the armament. The problem of accidental detonation is particularly acute in the vicinity of radar and radio transmitters, and elaborate precautions are necessary for arming aircraft and the like to prevent accidental firing of the armaments.

The device of this invention prevents currents above frequencies of such as about 10 kilocycles per second from flowing through a squib, with the result that the possibility of accidental firing of a squib by environmental radiation is virtually eliminated. The devices of this invention are particularly effective in protecting a squib located in the vicinity of transmitters broadcasting at radar or radio frequencies, such as occurs on the decks of aircraft carriers and the like.

It is an object of this invention to provide a firing squib and protective device therefor wherein the squib is protected from accidental actuation by environmental electromagnetic radiation.

It is another object of this invention to provide an integral squib and protector therefor which may be used in substantially any application in which a firing squib is now used.

It is another object of this invention to provide a rugged circuit element which is unaffected by impact acceleration, temperature or corrosive conditions.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

Figure 1:
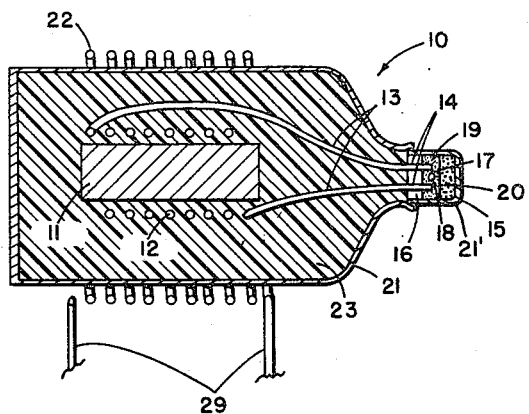
FIGURE 1 is a cross-sectional elevation of one embodiment of the device of this invention.

In FIGURE 1 is shown device 10 comprising core 11 of ferromagnetic material such as iron with secondary circuit windings 12 wound thereon. Lead wires 13 connect the ends of windings 12 to posts 14 of squib 15. Posts 14 of squib 15 pass through insulating plug 16 and are connected to the ends of bridgewire 17. A thermally ignitable charge of material 18 is disposed about bridgewire 17. Booster charge 19 is provided immediately adjacent material 18, and main charge 20 fills the remaining volume of squib 15. Charges 19 and 20 are explosive materials such as black powder or the like. The construction of squib 15 is conventional and comprises no part of this invention. Shield 21 is a closed conductive container which encloses windings 12 and lead wires 13 and the portion of posts 14 exterior to squib 15. Container 21' enclosing the ignitable powder of squib 15 is, in a preferred embodiment of this invention, conductive, and is tightly and hermetically sealed to shield 21 so that a continuous conductive enclosure is provided by the two members. Primary circuit windings 22 are wound on the outside of shield 21. Secondary circuit insulated winding 12 and shield 21 are separated by dielectric material 23. Material 23 may comprise any dielectric and preferably comprises synthetic resin in which core 11, windings 12 thereon, and lead wires 13 can be potted in operable manner. In a preferred embodiment of this invention, container 21' and shield 21 comprises a non-magnetic metal or alloy such as copper, tin, zinc, aluminum or magnesium or may comprise paramagnetic or ferromagnetic material such as steel, nickel, or other operable conductive material, including non-metallic materials such as carbon, graphite, etc.

A squib as used herein is conventional in construction and may be for example a military version which is 0.437 inch long and 0.271 inch in diameter. Device 10 is preferably not more than three inches in length and 1½ inches in diameter. As is aparent, device 10 may be made much smaller in dimension than the preferred limiting size. In operation, electrical current flowing from a supply source such as a battery-powered or generator-powered source flows through conductors 29 and primary circuit coil 22. A changing magnetic field is created by a change in current in the coil so that an initial current pulse increasing in amperage generates an expanding magnetic field which cuts across secondary circuit windings 12 and induces a voltage difference therein. Current flows in winding 12 and leads 13 through bridgewire 17 to ignite initiator charge 18 and detonate the squib. Current flow of the order of a few tenths of an ampere in bridgewire 17 will be sufficient to ignite charge 18 when the bridgewire is of such composition and dimension as to become sufficiently heated to ignite the explosive charge by the current flow. Corrosion-resistant material such as platinum-iridium alloy is preferred for the bridgewire. The initial current flow in winding 22 desirably should be sufficient to operably ignite suib 15 so as to enable either direct or alternating current to be used in the energizing circuit. Primary circuit potentials of 28 volts are commonly provided in aircraft armament systems, and it is desirable in such systems to provide a safety factor so that a squid will fire when lesser potentials such as 10 or 12 volts or less are developed in the primary circuit. In the devices shown herein, such as in device 10 of FIGURE 1, voltages may be stepped up or stepped down as desired by varying the ratio of turns in the windings of primary and secondary circuits, as will be apparent. Also, the duration of current flow in the secondary circuit when a step-wave of direct current is supplied to the primary circuit may be varied by the ratio and number of turns in the windings of primary and secondary circuits.

The windings of the primary and the secondary circuits in device 10 of FIGURE 1 are disposed in superimposed concentric relation, but other arrangements which provide sufficient changing magnetic flux through the winding of the secondary circuit to induce the energy necessary to ignite squib 15 may also be utilized. Shield 21 comprises a container of conductive material which encloses the secondary circuit elements. The provision of shield 21 operably prevents high-frequency current of a magnitude sufficient to fire squib 15 from being induced in secondary winding 12 and leads 13. Energy transfer from spurious radiation of radio or radar frequencies between the primary and secondary circuits is minimized by the interdisposition of the metal shield between the primary and secondary windings. High-frequency currents which are induced in the primary circuit are expended as eddy currents in the shield in a surface layer adjacent the outermost surface of the shield. The eddy current flow is expended by energy degradation into heat which is readily dissipated by conduction and radiation from the shield. Energy transfer from currents of lesser frequency is operably provided in the firing circuit for igniting the squib, because the thickness of the shield is much less than the skin thickness for current of that frequency. Skin thickness $\delta$ is that linear dimension transverse to current flow in which current or field penetrating into a conductor many times $\delta$ in thickness will decrease to $$\frac{1}{e}$$

times its magnitude at the surface of the conductor wherein $e$ is the base of natural logarithms. The skin thickness in meters is given as $$\delta = \sqrt{\frac{1}{\pi f \mu \sigma}}$$

where $f$=frequency in c.p.s., $\mu$=permeability of the metal in $h/m$, $\sigma$=conductivity of the metal in mhos/m. The factors to be considered in determining optimum shield thickness are the frequencies of the current to be passed and of the current to be suppressed, as well as the permeability and conductivity of the metal or other conductive material which is used for the shield. It will be apparent from the formulas presented that the amplitude of any given high-frequency current in the primary circuit may be suppressed in the secondary circuit to any degree desired virtually to total elimination by proper selection of shield composition and thickness. Conversely, the amplitude of any given low-frequency current can be passed by the shield virtually without attenuation if desired. Although other factors influence the efficiency of the energy transfer by inductive coupling herein, the shield is the primary frequency-dependent variable. Thus, a relatively narrow cut-off frequency range is provided by a device of this invention, whereas a much broader cut-off frequency range is provided by an unshielded device. By proper selection of a shield any given high-frequency current in the primary circuit may be quenched or attenuated in any degree for safety in the inductively coupled secondary circuit without materially attenuating energy transfer by lower frequency currents. Thus, any safety factor may be provided as desired to insure that high-frequency currents of operable amplitude are not induced in the secondary circuit.

The necessary embodiment common to all of the devices of this invention is that a continuous shield is provided for the secondary circuit elements including the secondary circuit windings, the squib, and the lead wires therebetween which operably shield and enclose such members from the effects of high frequency electro-magnetic radiation in the immediate environment of the shield.

Figure 2:
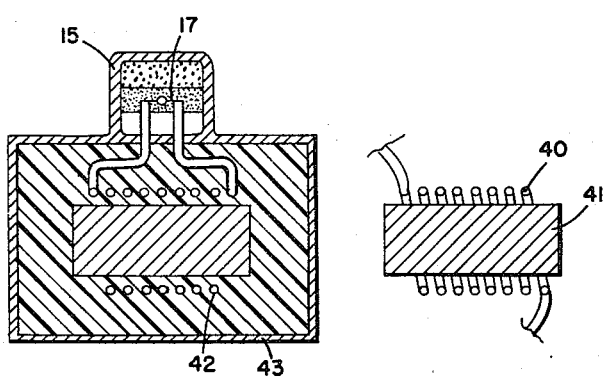
FIGURE 2 is a cross-sectional elevation of another embodiment of this invention wherein a primary winding is remotely disposed from the secondary winding.

In FIGURE 2 is shown another embodiment of the invention wherein primary circuit windings 40 on core 41 are remotely disposed from secondary circuit windings 42 and conductive shield 43. Shield 43 comprises a sealed enclosure which is electrically connected to the enclosure of squib 15. The enclosure of squib device 15 is electrically conductive. The device shown in FIGURE 2 operates in substantially identical manner to the device of FIGURE 1 by a relatively low frequency energizing current flowing in primary circuit windings 40 producing a changing magnetic flux which penetrates shield 43 and secondary circuit windings 42 and induces a voltage in the secondary circuit across the bridgewire of the squib sufficient to detonate the squib. The initial pulse of current which flows in the secondary circuit is sufficient to ignite the squib so that the device is operable with either direct current or alternating current, the magnitude of the voltage in the secondary circuit being a function of the rate of change of current flow in the primary circuit. The more nearly instantaneous the change in the primary circuit, the greater is the voltage induced in secondary circuit and across bridgewire 17 in squib 15. It is to be understood that the disposition of primary circuit windings and secondary circuit windings in the devices of this invention are not critical to the invention, but are material only to the production of operable energy in the secondary circuit to detonate the squib.

Figure 3:
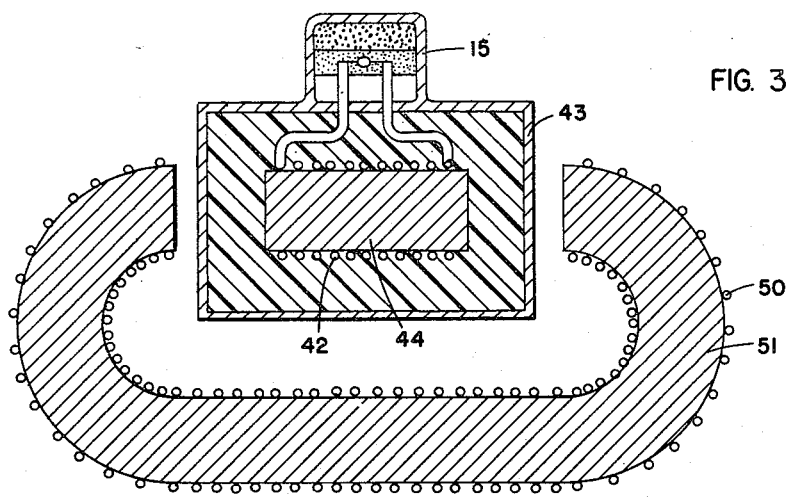
FIGURE 3 is a cross-sectional elevation of another embodiment of the device of FIGURE 3, but wherein the primary circuit is configured to provide magnetic flux of high density linking the secondary winding.

In FIGURE 3 is shown another embodiment of the invention wherein primary circuit windings 50 are wound on horseshoe-configured core 51. Conducting shield 43 enclosing secondary circuit windings 42 on core 44 is disposed between the opposed end extremities of core 51. Squib device 15 is sealed to enclosure 43 and electrical connection is established between enclosure 43 and the outer case of squib 15. The geometry of windings 50 on core 51 provides a greater flux density through core 44 of secondary windings 42 than does the asymmetrically disposed primary circuit of FIGURE 2. The utilization of magnetic flux in the device of FIGURE 3 is superior to that of the device of FIGURE 2 and the configuration is therefore preferred to the configuration of FIGURE 2.

Figure 4:
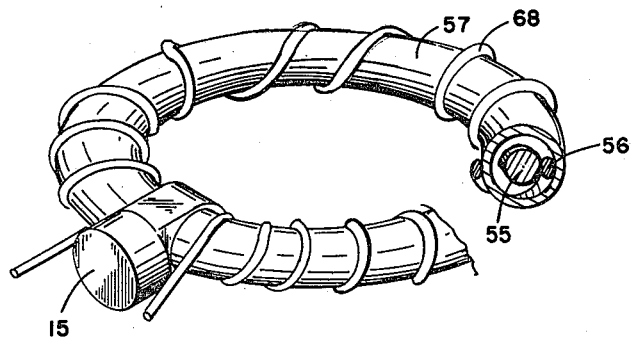
FIGURE 4 is a cut away of a perspective view of a coaxially wound toroidally configured device of this invention.

In FIGURE 4 is shown another embodiment of the invention wherein the windings of the primary circuit and secondary circuit are coaxially wound in a torroidal-configuration. Core 55 is of circular configuration and comprises ferro-magnetic materials such as soft iron or the like, either laminated or non-laminated as may be desired. Secondary circuit windings 56 of insulated wire are helically wound on core 55 substantially entirely around the torroid. Conductive layer 57 is provided concentrically around core 55 and enclosing secondary circuit windings 56 to shield the secondary circuit winding from electro-magnetic radiation which would otherwise induce a voltage within secondary windings 56. Primary circuit windings 68 are helically wound concentrically upon layer 57 to provide a device similar in operation to the devices heretofore described. Secondary windings 56 may be operably connected to squib 15 in operable manner with the outer enclosure of squib 15 and conducting layer 57 being connected to provide a continuous electric current path through the squib enclosure and layer 57 in the device. The device shown in FIGURE 4 is of torroidal configuration but may be of substantially square or rectangular configuration or any other operable configuration which entirely shields the secondary circuit elements, including windings 56, squib 15 and at least one lead from the windings to the squib.

Figure 5:
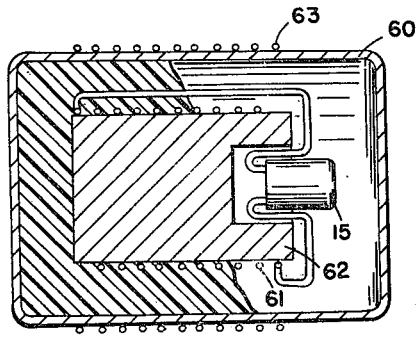
FIGURE 5 is a cross-sectional elevation of another embodiment of this invention wherein a unitary shield is shown.

In FIGURE 5 is shown another embodiment of the invention wherein squib 15 is disposed interior to shield 60 together with secondary circuit winding 61, and core 62. The secondary circuit windings, squib device, and secondary circuit core are substantially similar to the device of FIGURE 1. Primary circuit windings 63 are provided in coaxial arrangement with secondary circuit windings 61 and external to shield 60 and wound thereon. In all cases wherein a primary circuit element or secondary circuit element is wound on a conducting member the windings are operably insulated to prevent current leakage from the circuit. It is apparent that the device of FIGURE 5 can only be used in those applications wherein a squib may be operably disposed apart from the charge to be ignited or when that charge may also be enclosed by shield 60. For this reason, the configuration shown in FIGURE 5 is not a preferred embodiment of this invention.

Figure 6:
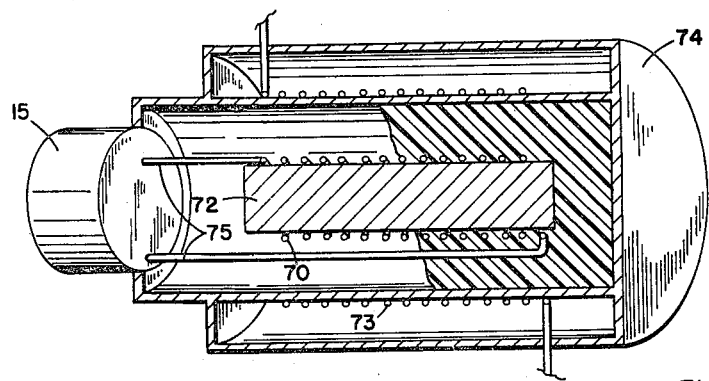
FIGURE 6 is a cross-sectional perspective view of another embodiment of this invention wherein a shielded primary winding is shown.

In FIGURE 6 is shown another embodiment of this invention wherein double walled shield 74 is provided around secondary circuit winding 70 on core 72 and primary circuit winding 73 coaxially disposed thereabout in an annular space between walls of double-walled annular shield 74, as shown. Shield 74 protects the windings of both the primary and secondary circuits from environmental electro-magnetic radiation and thereby doubly protects the squib from spuriously induced currents. That portion of the shield which encloses the primary circuit winding has no effect on the energy transfer between circuits, and the design considerations are similar to those heretofore described; however, a lesser safety factor may be justified by providing a shielded primary circuit winding. A squib 15 may be connected to windings 70 and shield 74 in the manner shown.

Figure 7:
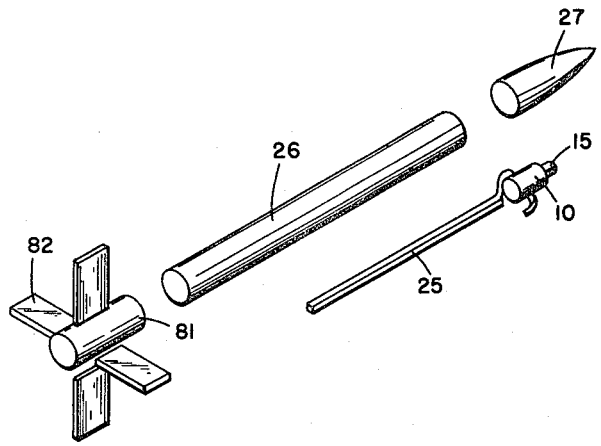
FIGURE 7 is an exploded perspective of a rocket provided with a device of this invention.

In FIGURE 7 is shown a 2.75 inch rocket in exploded view wherein projectile 27 comprises the foremost portion of the rocket, and tailpiece 81 comprises the rearmost portion of the rocket. Fins 82, tailpiece 81, provide flight-stabilizing means for the rocket. Body member 26 contains the propulsive charge for the rocket and is provided with resonance rod 25 in the fore-end of which device 10 and squib 15 of FIGURE 1 are operably disposed. Device 10 may be any other operable means heretofore described. Projectile 27 comprises a warhead in operable manner.

Figure 8:
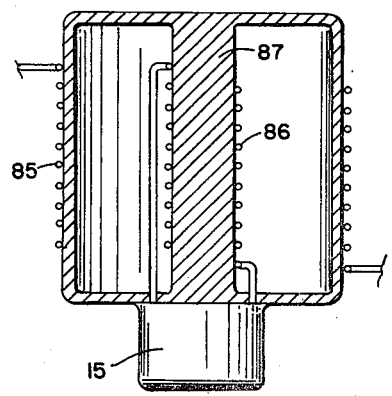
FIGURE 8 is a cross-sectional elevation of another embodiment of this invention wherein an integral core and shield member is shown.

In FIGURE 8 is shown another embodiment of the invention wherein primary circuit windings 85 are disposed coaxially with secondary circuit windings 86 and wherein core 87 is electrically conductive and is preferably ferromagnetic, for most efficient operation of the device as an inductor. Dielectric material such as synthetic resin or the like may be provided in the annular space within the member 87 if desired, but is not necessary.

Figure 9:
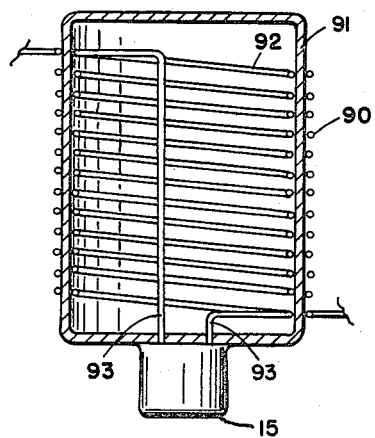
FIGURE 9 is a cross-sectional elevation of a device of this invention wherein a primary and secondary circuit winding of an inductor are disposed adjacent opposite surfaces of a shield member.

In FIGURE 9 is shown another embodiment of this invention wherein primary circuit windings 90 are wound on the outside of conductive casing 91 and secondary circuit windings 92 are wound on the inside of casing 91. The secondary windings are operably connected to squib 15 by electric leads 93. A core is not provided for the secondary circuit in this embodiment of the invention and therefore the embodiment is not a preferred embodiment of the invention inductive efficiency of the device being less than the embodiments wherein a ferromagnetic core is provided for the secondary circuit.

Figure 10:
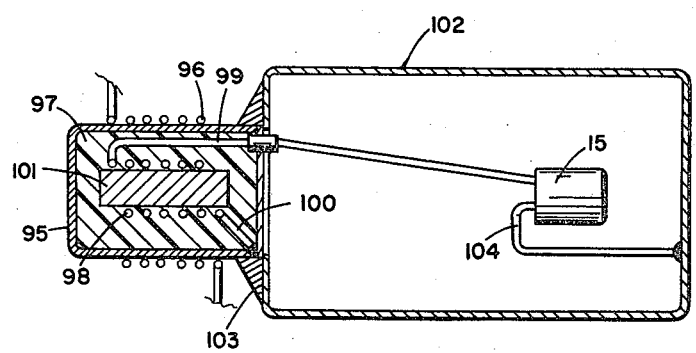
FIGURE 10 is a cross-sectional elevation of another embodiment of this invention wherein shield means comprises one electric connection between the secondary circuit and the squib.

In FIGURE 10 is shown another embodiment of the invention wherein shield 95 is provided with primary circuit windings 96 of insulated conductor wound thereon. Shield 95 is filled with di-electric material such as phenolic thermoset synthetic resin, polymethylmethacrylate, polyethylene or other operable material. Secondary circuit elements comprising secondary circuit winding 98, lead wire 99, lead wire 100, and core 101 are potted in material 97 in operable manner. Conductive container 102 is operably sealed to shield 95 by conductive resinous material 103. Material 103 may comprise a conventional synthetic resin which is admixed with metal particles or the like to be rendered conductive, such material being commercially available and comprising no part of this invention. Lead wire 100 is connected to the shielding enclosure comprising shield 95, container 102, and material 103. Lead wire 99 is insulated from the shielding enclosure and connects to squib 15 as shown. Lead wire 104 from squib 15 is connected to container 102 to provide a closed circuit through the container, material 103, and lead wire 100 to secondary winding 98.

The following examples illustrate the applicability of this invention to a conventional type of squib for military armaments. As used herein "squib" means the sealed, unitized explosive charge, bridge wire and posts or connectable lead wires therefore and does not include windings.

*Example I*

Device I(a) was constructed as shown in FIGURE 1 above. A squib of a type usable with the device has the following operating characteristics;

Resistance of squib circuit: 0.7–1.3 ohms
Squib circuit test current: <10 ma.
100% inoperable firing current: 0.2 amp.
100% effective firing current: 0.3 amp.
Recommended firing current: 1.5 amp.
Electro-static sensitivity: 52,000 ergs from a 400 mmfd. condenser
Bridge wire: 0.001 inch platinum-iridium alloy wire
Lead wire lengths: Vary between 1¼ inches and 20½ inches, according to model
Weight: 1.25 grams to 5.25 grams, depending on lead wire length.

Enclosure 21 comprised 0.014 inch thick copper sheet configured as a cylinder with a 0.5 inch outside diameter. Primary winding 22 comprised one layer of No. 24 enamelled copper wire close wound for 1.5 inches axial length. Secondary winding 12 comprised wires having the same number of turns as the primary winding and wound on a 0.38 inch diameter cold drawn iron core.

Device I(b) comprised a device similar to device I(a), but wherein cardboard was substituted for copper in shield 21.

Figure 11:
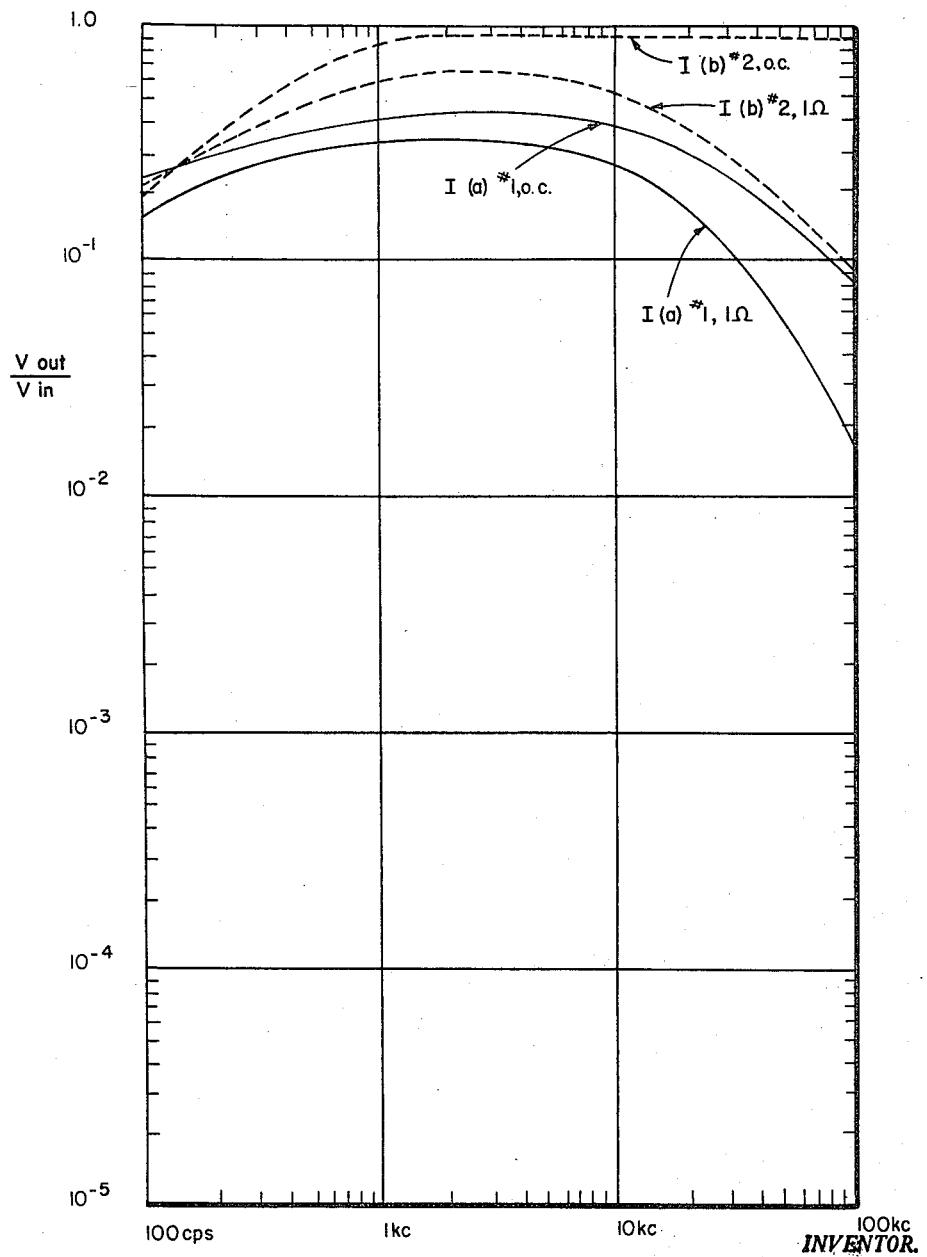
FIGURE 11 is a graph of operating data of one device of this invention in comparison with a device which is not in accordance with the invention.

To standardize experimental procedure, a calibrated one-ohm load was substituted for the squib in all tests. Open circuit and closed circuit tests were performed. The results of the tests are graphed in FIGURE 11 wherein the ratio of the secondary circuit voltage ($V_{out}$) to the primary circuit voltage ($V_{in}$) is plotted against the frequency of the charging current in the primary circuit. The curves marked o.c. depict open circuit tests and the curves marked 1Ω depict closed circuit tests. Closed line curves show results obtained with device I(a) and broken line curves show results obtained with device I(b).

It will be observed that at frequencies of 10 kc. and greater the voltage induced in the secondary circuit of device I(a) is attenuated with respect to the voltage in the primary circuit thereof more strongly than in device I(b).

*Example II*

A device substantially as shown in FIGURE 1 comprising one layer of closely spaced windings of No. 24 enamelled copper wire having a diameter of 0.021 inch for approximately 1.50 inches axial length was provided. The dimensions of shield 21 were 0.50 inch outside diameter and 0.470 inch inside diameter with a 0.015 inch thick copper wall. The shield was configured with one closed end and one closable end. The secondary winding comprised six concentric layers in series of No. 24 enamelled copper wire wound on a cold drawn iron core of 0.185 inch diameter for an axial length of 1.25 inches. Each layer comprised the same number of turns as primary windings.

*Example III*

Primary circuit: same as Example II.
Secondary circuit: same as Example II.
Shield: copper of 0.50 inch outside diameter and 0.44 inch inside diameter; wall thickness of 0.03 inch.

*Example IV*

Primary circuit: same as Example II.
Secondary circuit: same as Example II.
Shield substitute: Polymethylmethacrylate of 0.50 inch outside diameter and .030 inch wall thickness.

*Example V*

Primary circuit: same as Example II.
Secondary circuit: same as Example II except four layers in series of wire were provided on core of 0.295 inch diameter.
Shield: same as Example II.

*Example VI*

Primary circuit: same as Example II.
Secondary circuit: same as Example II except two layers in series of wire were provided on a core of 0.380 inch diameter.
Shield: same as Example II.

*Example VII*

Primary circuit: same as Example II.
Secondary circuit: same as Example II, except 0.215 inch diameter core was provided.
Shield: same as Example II.

Figure 12:
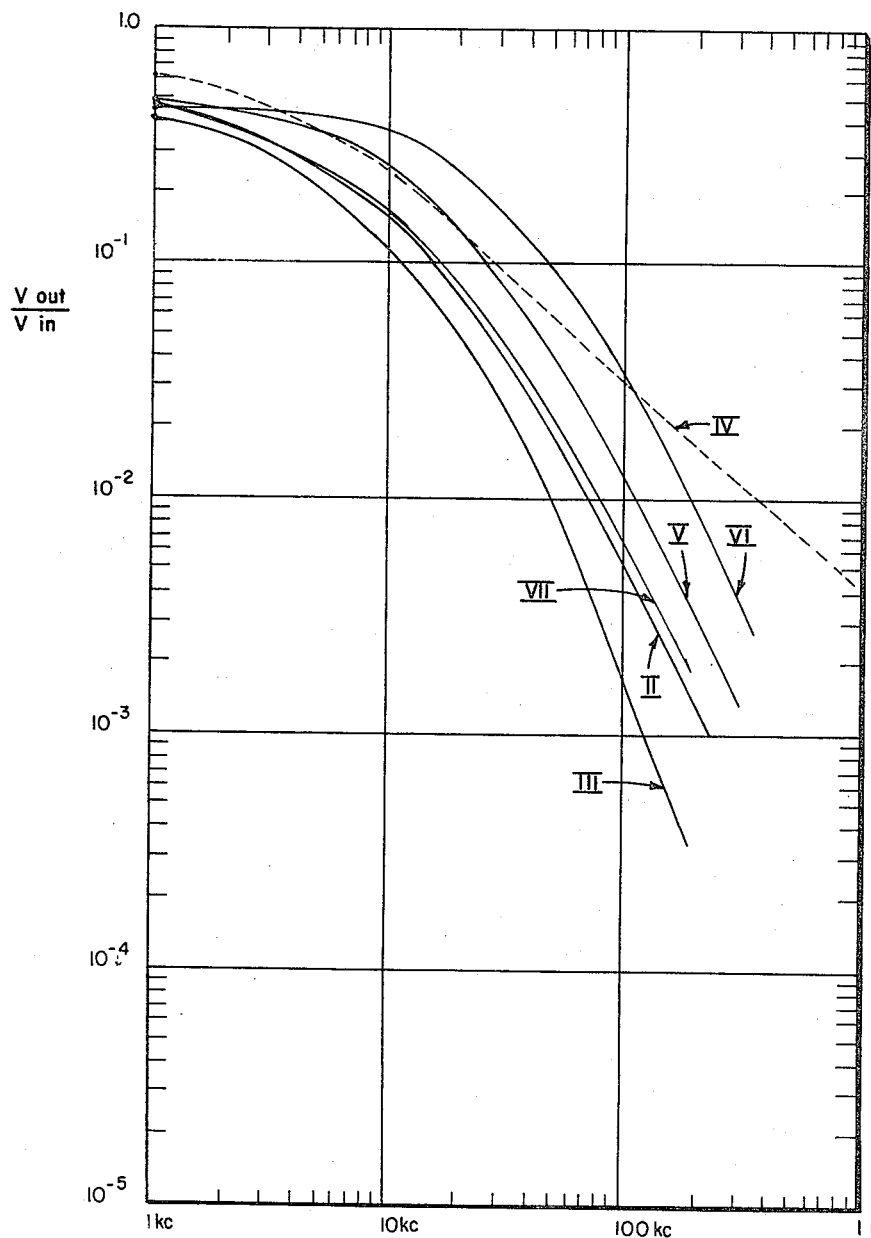
FIGURE 12 is a graph of operating data of devices of this invention wherein shield thickness, core diameter, and ratio of primary to secondary turns are changed.

The results of tests with the devices of Examples II–VII when provided with one-ohm loads in the secondary circuit are shown in FIGURE 12. The ratio of voltage in the secondary circuit ($V_{out}$) to voltage in the primary circuit ($V_{in}$) is plotted versus frequency of the current in the primary circuit.

Figure 13:
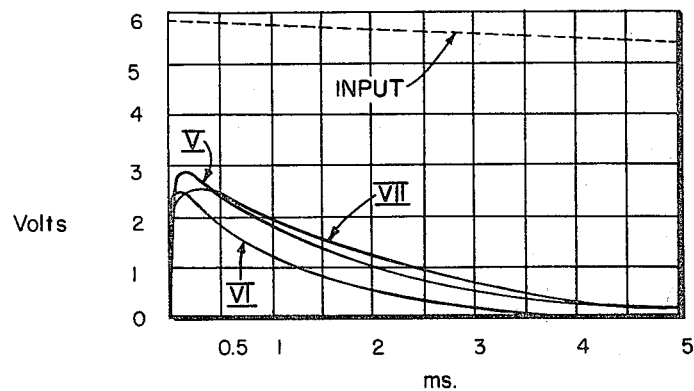
FIGURE 13 is a graph of voltage magnitude of a direct current pulse in a device of this invention.

A difference in the number of layers of windings connected in series in the secondary circuit, as shown in the curves for the devices of Examples II, V, and VI in FIGURE 12, wherein 6, 4, and 2 layers, respectively, of series connected windings are provided, produces the results shown. The voltage-time response of the secondary circuit for 6-volt direct current in the primary circuit is shown in FIGURE 13 for the devices of Examples VII, V, and VI. The number of layers of windings is relatively non-critical to the invention herein set forth.

The ratio of voltage in the secondary circuit to voltage in the primary circuit is materially affected by the shield thickness and is decreased in proportion to the increase in the thickness of a shield, as shown in the curves for the devices of Examples II, III, and IV. The shield thickness is therefore a material factor in the selection of a device for use in a particular application. As shown by the curve in FIGURE 12, for Example IV, a non-conducting material in place of the metal shield does not materially influence the pick-up of current in the squib and is not operable herein because adequate certainty of attenuation is not provided.

Figure 14:
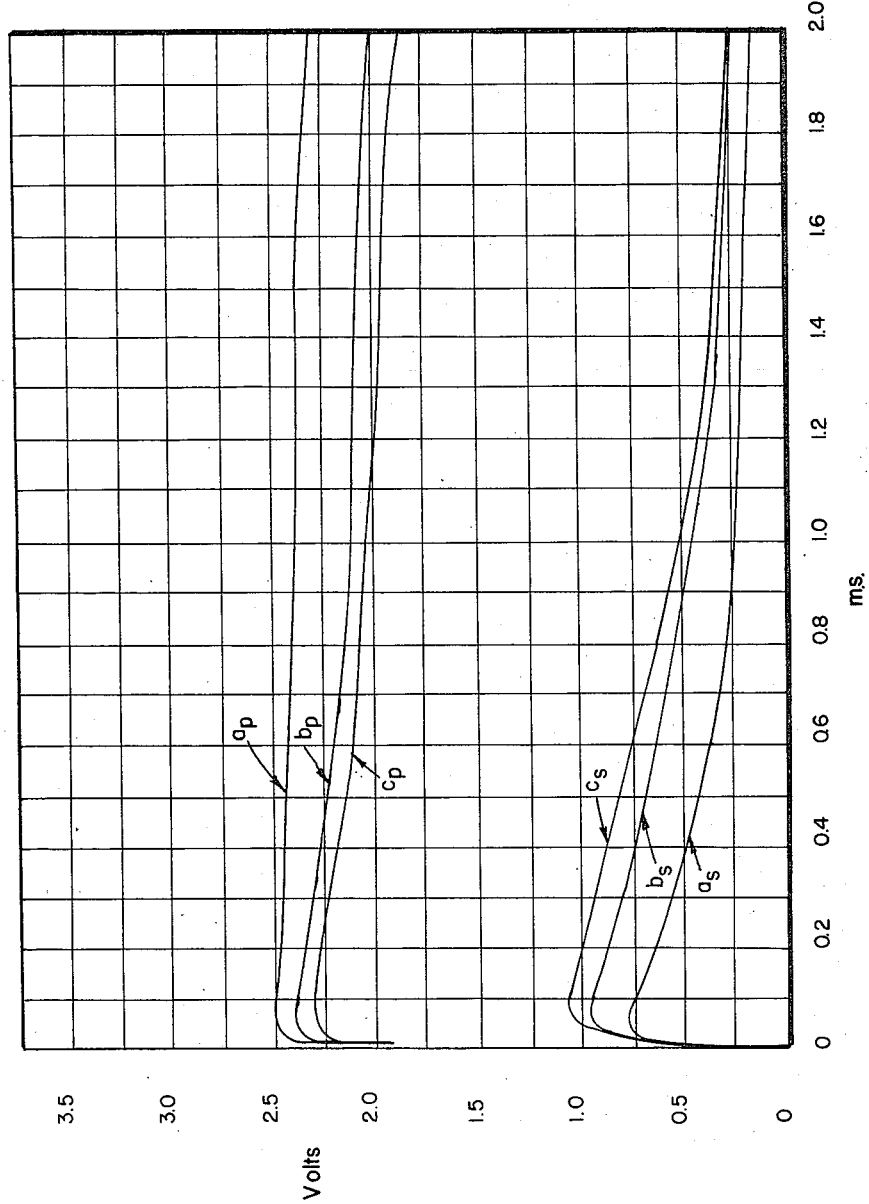
FIGURE 14 is a graph of secondary circuit voltage when multiple layers of parallelly connected primary circuit windings are provided.

The effect produced by changing the diameter of the core in which the secondary winding is wound is shown on FIGURE 14 for the curves of Examples II and VII to be relatively minor, although not negligible.

All of the devices described and illustrated provide substantially similar characteristic response to change in high-frequency radiation.

*Example VIII*

The device I(*a*) of Example I was provided in separate tests with 1, 2, and 3 layers of parallel connected primary circuit windings. The secondary circuit was provided with a one-ohm load. A 6-volt battery was connected to the primary circuit by means of a mercury switch. The pulses produced by flow of direct current in the 1, 2, and 3 parallel connected primary circuit layers are shown by curves $a_p$, $a_s$, $b_p$, $b_s$, $c_p$, $c_s$, of FIGURE 14, wherein $a$, $b$, $c$ relate to 1, 2, and 3 layers, respectively of primary windings and subscripts $p$ and $s$ relate to primary and secondary circuits respectively.

While certain modifications and embodiments of the invention have been described, it is of course to be understood that there are a great number of variations which will suggest themselves to anyone familiar with the subject matter thereof, and it is to be distinctly understood that this invention should not be limited except by such limitations as are clearly imposed in the appended claims.

I claim:

1. Means to initiate a rapid self-sustaining chemical reaction comprising, in combination with a member which is heated by passing electric current through the member and reactant substances adjacent said member:
    a secondary winding having its ends electrically connected respectively by conductive means to the ends of said member, a primary winding inductively coupled to said secondary winding, means to connect the ends of said primary winding to a source to provide at least one pulse of electrical current in said primary winding to provide a field of changing magnetic flux which links said secondary winding,
    a single core of magnetically soft metal, said core providing a core for said secondary winding and also for said primary winding, said core extending through both of said windings, said core being of substantially constant cross-sectional area and shape throughout the portion of its length which extends through said windings,
    said core being unshunted around said primary winding;
    first supporting means, said secondary winding wound on said supporting means, second supporting means rigidly and securely attached, as by potting, to said first supporting means, said primary winding wound on said second supporting means,
    characterized by an electromagnetic shield interposed between said primary and secondary windings,
    said shield entirely electrically enclosing the secondary winding, the member, at least the entirety of one electrical conductor extending from said secondary winding to said member, and said reactant substances,
    said shield devoid of electrical conductors extending therethrough,
    said shield constituting a shorted turn,
    said shield essentially devoid of electrical apertures therein.

2. The device of claim 1 further characterized by means which provide a closed path through magnetic material for the flux which links said primary and secondary windings.

3. The device of claim 2 wherein said reactants constitute an explosive mixture.

4. The device of claim 2 wherein said reactants react to produce a brilliant flash of light.

5. The device of claim 2 wherein the means which connect the ends of the secondary winding to the ends of the filament are insulated from the shield.

6. The device of claim 2 further characterized by said core being toroidal.

7. The device of claim 1 wherein said reactants constitute an explosive mixture.

8. The device of claim 1 wherein said reactants react to produce a brilliant flash of light.

9. The device of claim 1 wherein the means which connect the ends of the secondary winding to the ends of the filament are insulated from the shield.

10. The device of claim 1 wherein a core of magnetic material is provided for said secondary winding and at least a portion of said core provides a portion of said shield.

11. The device of claim 1 wherein a core of magnetic material is provided for said secondary winding and said core is electrically insulated from said shield.

12. Means to initiate a rapid self-sustaining chemical reaction comprising, in combination with a member which is heated by passing electric current through the member and reactant substances adjacent said member:

a secondary winding having its ends electrically connected respectively by conductive means to the ends of said member, a primary winding inductively coupled to said secondary winding, means to connect the ends of said primary winding to a source to provide at least one pulse of electrical current in said primary winding to provide a field of changing magnetic flux which links said secondary winding, a single core of magnetically soft metal, said core providing a core for said secondary winding and also for said primary winding, said core extending through both of said windings, said core being of substantially constant cross-sectional area and shape throughout the portion of its length which extends through said windings, said core being unshunted around said primary winding, first supporting means, said secondary winding wound on said supporting means, second supporting means rigidly and securely attached, as by potting, to said first supporting means, said primary winding wound on said second supporting means, characterized by an electromagnetic shield interposed between said primary and secondary windings, said shield entirely electrically enclosing the secondary winding, the member, at least the entirety of one electrical conductor extending from said secondary winding to said member, and said reactant substances, said shield devoid of electrical conductors extending therethrough, said shield constituting a shorted turn, said shield being altogether continuous throughout and totally devoid of any electrically effective apertures therein.

13. The device of claim 12 further characterized by means which provide a closed path through magnetic material for the flux which links said primary and secondary windings.

14. The device of claim 13 wherein the means which connect the ends of the secondary winding to the ends of the filament are insulated from the shield.

15. The device of claim 13 further characterized by said core being toroidal.

16. The device of claim 12 wherein the means which connect the ends of the secondary winding to the ends of the filament are insulated from the shield.

17. The device of claim 12 wherein a core of magnetic material is provided for said secondary winding and at least a portion of said core provides a portion of said shield.

18. The device of claim 12 wherein a core of magnetic material is provided for said secondary winding and said core is electrically insulated from said shield.

References Cited in the file of this patent

UNITED STATES PATENTS

| | | |
|---|---|---|
| 1,320,980 | Bowman | Nov. 4, 1919 |
| 1,689,929 | Osborne | Oct. 30, 1928 |
| 2,459,854 | Swift | Jan. 25, 1949 |
| 2,628,342 | Taylor | Feb. 10, 1953 |
| 2,640,417 | Bjork et al. | June 2, 1953 |
| 2,678,413 | Adler et al. | May 11, 1954 |
| 2,905,915 | Harris | Sept. 22, 1959 |
| 2,918,001 | Alford | Dec. 22, 1959 |
| 2,921,522 | Apstein | Jan. 19, 1960 |
| 2,948,871 | Craige | Aug. 9, 1960 |
| 3,038,384 | Gaugler | June 12, 1962 |